(12) United States Patent
Hao et al.

(10) Patent No.: US 12,731,805 B2
(45) Date of Patent: Sep. 8, 2026

(54) PREPARATION PROCESS FOR COMPOSITE MEMBRANE FOR FUEL CELLS

(71) Applicant: DALIAN INSTITUTE OF CHEMICAL PHYSICS, CHINESE ACADEMY OF SCIENCES, Dalian (CN)

(72) Inventors: Jinkai Hao, Dalian (CN); Hongjie Zhang, Dalian (CN); Zhigang Shao, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 677 days.

(21) Appl. No.: 18/256,936

(22) PCT Filed: Sep. 22, 2021

(86) PCT No.: PCT/CN2021/119574
§ 371 (c)(1),
(2) Date: Jun. 12, 2023

(87) PCT Pub. No.: WO2022/127253
PCT Pub. Date: Jun. 23, 2022

(65) Prior Publication Data

US 2024/0039024 A1 Feb. 1, 2024

(30) Foreign Application Priority Data

Dec. 14, 2020 (CN) ........................ 202011476933.X

(51) Int. Cl.
*H01M 8/1088* (2016.01)
*H01M 8/10* (2016.01)
(Continued)

(52) U.S. Cl.
CPC ....... *H01M 8/1088* (2013.01); *H01M 8/1039* (2013.01); *H01M 8/1067* (2013.01);
(Continued)

(58) Field of Classification Search
CPC ............. H01M 8/1088; H01M 8/1039; H01M 8/1067; H01M 2008/1095; H01M 2300/0082
See application file for complete search history.

(56) References Cited

U.S. PATENT DOCUMENTS

2020/0168937 A1 5/2020 Ahn et al.

FOREIGN PATENT DOCUMENTS

CN 101667648 A * 3/2010
CN 101752574 A * 6/2010
(Continued)

*Primary Examiner* — Nicole M. Buie-Hatcher
*Assistant Examiner* — Taylor Harrison Krone
(74) *Attorney, Agent, or Firm* — NKL Law; Allen Xue

(57) ABSTRACT

A preparation process of composite membrane for fuel cells uses an expanded polytetrafluoroethylene microporous base membrane as a skeleton. The base membrane is subjected to an impregnation treatment of mixed solutions having different concentrations from low to high. Specifically, the treatment tank I is provide with a mixed solution of a 0.1 wt. %-1 wt. % perfluorosulfonic acid resin solution, a water-retaining agent and a free radical quencher, the treatment tank II is provided with a mixed solution of a 2 wt. %-6 wt. % perfluorosulfonic acid resin solution, a water-retaining agent and a free radical quencher, and the treatment tank III is provided with a mixed solution of a 7 wt. %-20 wt. % perfluorosulfonic acid resin solution and a sulfonated polyetheretherketone solution. The resulting proton exchange composite membrane does not generate pore residues and avoids hydrogen permeation when in use.

9 Claims, 2 Drawing Sheets

(51) Int. Cl.
*H01M 8/1039* (2016.01)
*H01M 8/1067* (2016.01)

(52) U.S. Cl.
CPC ............... *H01M 2008/1095* (2013.01); *H01M 2300/0082* (2013.01)

(56) References Cited

FOREIGN PATENT DOCUMENTS

| | | | | |
|---|---|---|---|---|
| CN | 108878993 A | * 11/2018 | ........ H01M 10/4235 |
| CN | 110459790 A | * 11/2019 | .......... H01M 8/1051 |
| CN | 110880615 A | 3/2020 | |
| CN | 111164813 A | 5/2020 | |
| CN | 112599824 A | 4/2021 | |

* cited by examiner

PREPARATION PROCESS FOR COMPOSITE MEMBRANE FOR FUEL CELLS

TECHNICAL FIELD

The present invention relates to the technical field of fuel cells, in particular to a preparation process of composite membrane for fuel cells.

BACKGROUND

Proton exchange membrane fuel cell (PEMFC) has the advantages of high power density, high energy conversion efficiency, low-temperature startup, and environmental friendliness, and is widely used in fields such as aerospace, energy, transportation, and military. Proton exchange membrane (PEM) is one of the core components of a cell, which is the substrate of electrolyte (proton transfer) and electrode active substance (catalyst). In addition, PEM is also a dense permselective membrane, which is different from ordinary porous thin membranes. An ideal PEM has high proton conductivity, low gas permeability, high mechanical strength, thermal stability and chemical stability, and appropriate cost performance.

Perfluorosulfonic acid proton exchange membranes used in the prior art have good proton conductivity and chemical stability at conditions of lower temperature (80° C.) and high humidity. However, the material itself also has many defects, such as poor dimensional stability, low mechanical strength, and gas permeability. The dimensional expansion of the membrane varies due to different water absorptions at different humidity levels. Under repeated working conditions, the proton exchange membrane will eventually be mechanically damaged. In addition, the existing perfluorosulfonic acid resin is expensive, over-thick membrane will increase the production cost, and greatly increase the ohmic voltage drop of the cell in cell applications, while over-thin membrane will reduce the mechanical strength and increase the permeability of the medium. Therefore, the problems, such as how to improve the strength and dimensional stability of perfluorosulfonic acid proton exchange membrane and reduce the medium permeability and cost, have become a major issue for fuel cells.

At present, the most promising one has been proposed is the perfluorosulfonic acid composite membrane reinforced by microporous polytetrafluoroethylene, which use the excellent performance of polytetrafluoroethylene to prepare thinner composite membrane and reduce the use amount of perfluorosulfonic acid resin. However, in the process of preparing composite membrane using the existing technology, on the one hand, the resin solution is unevenly distributed in the pores of the microporous membrane, and some micropores cannot be impregnated in the resin while a layer of resin membrane is formed on the surface of the microporous membrane, resulting in penetration, gas leakage and hydrogen permeation of the composite membrane during the battery operation; on the other hand, the composite membrane prepared by directly impregnating the microporous membrane in resin solution has low proton conductivity, and the filled resin is prone to degradation by strong oxides such as hydroxyl radicals generated during battery operation, which not only causes membrane perforation, but also prone to risk hydrogen leakage. Besides, the composite membrane prepared by a single impregnation method still cannot solve the problem of the battery performance decline under high temperature and low humidity conditions.

SUMMARY OF THE INVENTION

It's an object of the present invention to overcome the defects of the existing technology of impregnating microporous membrane with perfluorosulfonic acid resin solution, and to provide a new process for preparing perfluorosulfonic acid composite membranes reinforced by polytetrafluoroethylene. The prepared proton exchange composite membranes of the present invention will not generate pore residues, which can meet the requirements of mechanical strength and dimensional stability while avoid hydrogen permeation during use, and has excellent electrochemical performance.

Technical solutions adopted by the present invention are as follows:

A preparation process of composite membrane for fuel cells, including the following steps of:

(a) pre-treating the base membrane by impregnating it in an alkaline solvent and irradiating it by a ultraviolet lamp, where the base membrane is a tetrafluoroethylene microporous membrane with a pore diameter of 1 to 20 μm, a porosity of 65% to 90%, and a thickness of 1 to 30 μm.

(b) impregnating the pre-treated base membrane in a solution I, performing a first-stage cooling and a second-stage cooling after drying, where the solution I is a mixture of a perfluorosulfonic acid resin solution with a concentration of 0.1 wt. %-1 wt. %, a water-retaining agent and a free radical quencher, where a mass of the water-retaining agent is 2%-5% of that of the perfluorosulfonic acid resin, a mass of the free radical quencher is 2%-5% of that of the perfluorosulfonic acid resin, and a mass ratio of the water-retaining agent to the free radical quencher is 1:1.

(c) impregnating the base membrane after completion of step (b) in a solution II, performing the first-stage cooling and the second-stage cooling after drying, where the solution II is a mixture of a perfluorosulfonic acid resin solution with a concentration of 2 wt. %-6 wt. %, a water-retaining agent and a free radical quencher, where a mass of the water-retaining agent is 2%-5% of that of the perfluorosulfonic acid resin, a mass of the free radical quencher is 2%-5% of that of perfluorosulfonic acid resin, and a mass ratio of the water-retaining agent to the free radical quencher is 1:1.

(d) impregnating the base membrane after completion of step (c) in a solution III, performing the first-stage cooling after drying, where the solution III is a mixture of the perfluorosulfonic acid resin solution with a concentration of 7 wt. %-20 wt. % and a sulfonated polyetheretherketone solution with a concentration of 7 wt. %-20 wt. %, and a mass ratio of the perfluorosulfonic acid resin to the sulfonated polyetheretherketone is 1:1.

Further, in step (a), the pre-treatment of the base membrane includes the following steps of:

(1) impregnating the base membrane in a 3 wt. %-5 wt. % hydrogen peroxide solution under 60-80° C. for 20-60 minutes;

(2) washing the impregnated base membrane with deionized water;

(3) impregnating the washed base membrane in an isopropanol solvent for 0.5-1 hours;

(4) vacuum drying the base membrane after completion of step (3) for 2-3 hours under an environment filled with protective gas; and, (5) ultraviolet irradiating the base membrane after completion of step (4) at a wavelength of 185 nm for 10-15 minutes in an environment filled with oxygen.

Further, in step (2), the washing manner is to impregnate the base membrane in a deionized water for 5-8 seconds and then take it out, repeating for 5-8 times. In step (4), the protective gas is inert gas comprising nitrogen and argon.

Further, in step (b), the water-retaining agent is one of $SiO_2$, ZnO, $TiO_2$ and $Al_2O_3$, the free radical quencher is one of MnO, $MnO_2$, $CeO_2$ and $ZrO_2$, and a solvent of the perfluorosulfonic acid resin solution is at least one of isopropanol and n-propanol.

Further, a temperature of the first-stage cooling is 40-50° C., and a temperature of the second-stage cooling is 0-10° C.

Further, a dying temperature is 40-150° C.

Further, the impregnation times of the base membrane in the solutions I, II and III are respectively 1.3, 1.1 and 0.7 times of a thickness of the base membrane by minutes.

The preparation method of the composite membrane in the present invention adopts a continuous impregnation device. The continuous impregnation device includes a treatment tank I, a drying oven I, a treatment tank II, a drying oven II, a treatment tank III, and a drying oven III arranged successively along a transmission direction of the composite membrane. Each outlet of the drying ovens I, II and III is provided with a cooling treatment area acting on the base membrane. Each cooling treatment area includes an air cooler I near the outlet of the drying oven, and an air cooler II near the inlets of the treatment tank. The continuous impregnation device is further provided with a plurality of drive rollers for transferring the composite membrane forward.

Further, the each outlet of the treatment tanks I, II and III is provided with an extension tank wall, and multiple sets of drive rollers for stretching and transferring the base membrane are disposed along the extension tank wall, with a transmission speed of 2-7 m/s. The outside of each outlet of the treatment tanks I, II and III is provided with a collection area located directly below the base membrane. The collection area includes a collection tank, which can be used to contain a large amount of mixed solution drained under the extrusion action of multiple sets of drive rollers.

A method for producing composite membranes using the above production device includes the following steps of:

(a) pre-treating the base membrane by impregnating it in an alkaline solvent and irradiating it by a ultraviolet lamp, where the base membrane is an expended tetrafluoroethylene microporous membrane with a pore diameter of 1 to 20 μm, a porosity of 65% to 90% and a thickness of 1 to 30 μm;

(b) impregnating the pre-treated base membrane in the treatment tank I, which has a mixture of perfluorosulfonic acid resin solution with a concentration of 0.1 wt. %-1 wt. %, a water-retaining agent and a free radical quencher, and then drying the impregnated base membrane in the drying oven I, followed by cooling with the air cooler I and air cooler II in turn.

(c) impregnating the base membrane after completion of step (b) in the treatment tank II, which has a mixture of perfluorosulfonic acid resin solution with a concentration of 2 wt. %-6 wt. %, a free radical quencher and a water-retaining agent, and then drying the impregnated base membrane in the drying oven II, followed by cooling with the air cooler I and air cooler II in turn;

(d) impregnating the base membrane after completion of step (c) in the treatment tank III, which has a mixture of perfluorosulfonic acid resin solution having a concentration of 7 wt. %-20 wt. % with a sulfonated polyetheretherketone liquid having a concentration of 7 wt %-20 wt %, and then drying the impregnated base membrane in the drying oven III, followed by cooling with the air cooler I to obtain the composite membrane.

The present invention also provides a composite membrane obtained by using the above preparation method.

Compared with the prior art, the present invention has the following advantages:

1. The present invention performs gradient impregnation on the base membrane, so that the obtained composite membrane has better uniformity, no hollow areas inside, smooth surface and excellent service performance.

In the treatment tank I, through the impregnation of low concentration resin, on the one hand, the filling degree of micropores is high, and leakage or incomplete filling of micropores are avoided; on the other hand, in the filling process of low concentration resin, the addition of water-retaining agent and free radical quencher not only increases the moisturizing function and service life of the composite membrane, but also improves its mechanical strength.

The impregnation of medium concentration resin in the treatment tank II further ensures that the micropores of the composite membrane are completely impregnated in the resin, and a dense and thin perfluorosulfonic acid resin layer is formed on the surface of the microporous membrane, and the degradation of perfluorosulfonic acid resin by strong oxidizing substances such as hydroxyl free radicals generated by the composite membrane during the battery operation is avoided by adding the water-retaining agent and the free radical quencher again in the resin solution, which completely solve the problems of perforation and gas leakage of composite membrane, so that the composite membrane is safe and reliable.

The impregnation in the treatment tank III further improves the adhesion amount of the resin, increasing both mechanical strength and electrochemical performance of the composite membrane. In particular, the addition of sulfonated polyetheretherketone resin further improves the operating environment of the composite membrane under high temperature conditions.

2. The process for preparing composite membranes in the present invention is simple, and the used materials are relatively common, which not only saves the preparation cost of the composite membrane, but also improves the performance of the composite membrane in the fuel cells, and further improves the service life of the composite membrane by doping the water-retaining agent and the free radical quencher.

3. During the pre-treatment of the base membrane, inorganic substance hydrogen peroxide and inorganic substance deionized water are used to clean the base membrane to ensure its purity before impregnation, so as to improve the preparation quality of the composite membrane. The hydrophilicity of the base membrane is increased through ultraviolet irradiating the base membrane in oxygen environment, and the impurities adhering to the surface of the base membrane are removed to obtain an ultra-clean surface. At the same time, the deionized water washing manner is a rapid extraction type, so that the residual hydrogen peroxide in the process of long-term contact with deionized water can be prevented from damaging the composite membrane, especially from the degradation of perfluorosulfonic acid resin.

4. In the preparation process of the present invention, a cooling treatment area is provided to achieve rapid cooling of the base membrane after drying, ensuring the production efficiency. The setting temperature of the air cooler I is closer to the temperature of the drying oven, while the temperature of the air cooler II is lower, so as to achieve a gradual cooling manner of the base membrane, avoiding defects such as strong rigidity, brittleness and easy to crack of the composite membrane caused by a sudden drop of the base membrane temperature once coming out of the drying oven.

In addition, by providing the extension tank walls and adding the drive rollers, the transmission distance is extended, so that a large amount of the mixed solution adhering to the impregnated base membrane can be conveniently drained under the extrusion of multiple sets of drive rollers during the transmission process. At the same time, the mixed solution can fall into the treatment tanks along the extension tank walls, or fall into the collection areas for storage, reducing waste and avoiding environmental pollution.

DETAILED DESCRIPTION OF DRAWINGS

In order to more clearly illustrate the technical solutions in the embodiments of the present invention or in the prior art, the accompanying drawings required to be used in the description of the embodiments or the prior art are briefly introduced. Apparently, the following described drawings are merely embodiments of the present invention. For those ordinary skilled in the art, other drawings can also be obtained according to the provided drawings without creative labor.

In the figures, 1—extension tank wall, and 2—collection area.

DETAILED DESCRIPTION OF PREFERRED EMBODIMENTS

Figure 1:
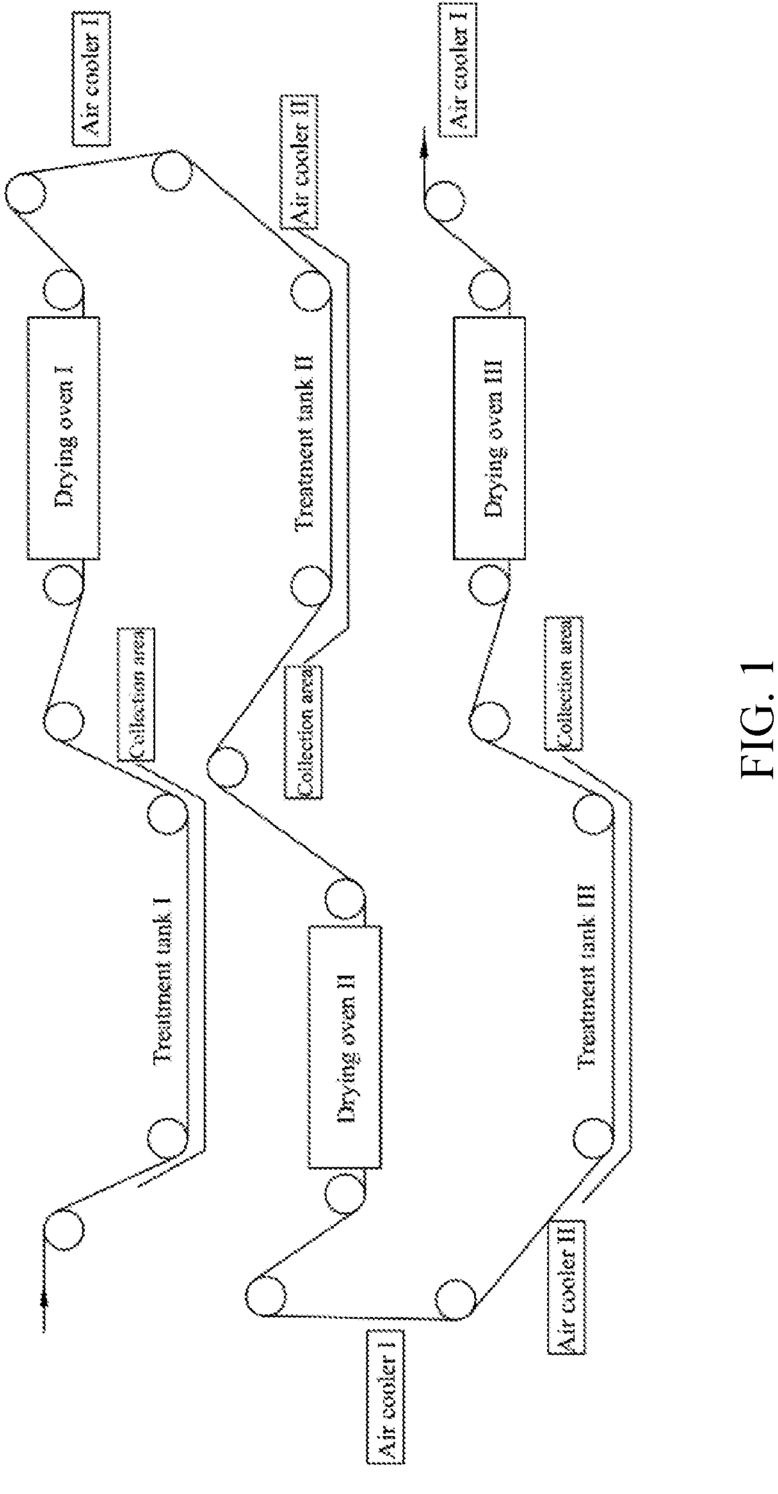
FIG. 1 is a schematic diagram of the overall transmission structure of the preparation process of the composite membrane in the present invention.
Figure 2:
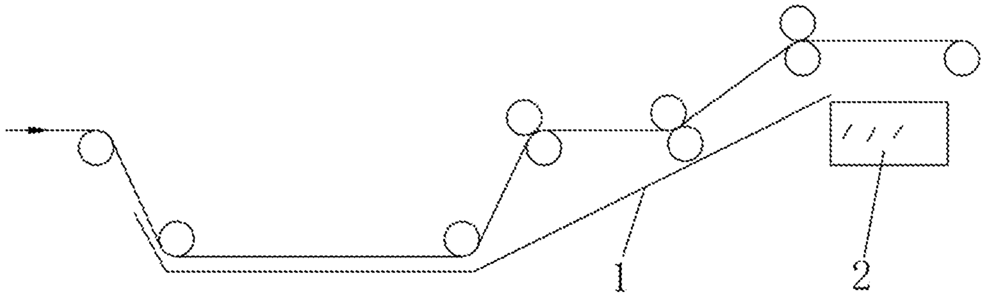
FIG. 2 is a schematic diagram of the extension tank wall and the collection area of the preparation process of the composite membrane in the present invention.

A preparation process of composite membrane for fuel cells, the composite membrane includes a base membrane which is an expanded polytetrafluoroethylene microporous membrane. As shown in FIG. 1, the device used in the preparation process includes a wrap-around conveyor, a treatment tank I, a treatment tank II, a treatment tank III, a drying oven I, a drying oven II, and a drying oven III. The wrap-around conveyor includes multiple sets of drive rollers for coiling the base membrane. The transmission direction of the base membrane driven by the drive rollers is to pass through the treatment tank I, the drying oven I, the treatment tank II, the drying oven II, the treatment tank III and the drying oven III in turn. The temperatures of the drying ovens I, II and III are set to 100° C. At the same time, each f outlet of the drying ovens I, II and III is provided with a cooling treatment area acting on the base membrane. Each cooling treatment area includes an air cooler I near the outlet of the drying oven and an air cooler 2 near the inlet of treatment tank. The temperature of the air cooler I is set to 45° C., and the temperature of the air cooler II is set to 5° C. Besides, as shown in FIG. 2, the each outlet of the treatment tanks I, II and III is provided with extension tank wall, and multiple sets of drive rollers for stretching and conveying the base membrane are added to each of the treatment tanks I, II and III along the extension tank wall. The outside of each outlet of the treatment tanks I, II and III is provided with a collection area located directly below the base membrane.

Embodiment 1 a. Pre-Treatment of Base Membrane

The expanded polytetrafluoroethylene microporous membrane with a pore size of 1 μm, a porosity of 90% and a thickness of 1 μm was put into a 3 wt. % $H_2O_2$ solution and heated at 60° C. for 20 minutes, followed by washing with a large amount of deionized water. The washing manner was to completely impregnate the base membrane in deionized water for 5 seconds and then to take it out, and the process of impregnating-taking out was repeated for 5 times. After the surface was free of $H_2O_2$ residue, the base membrane was impregnated in an isopropanol solvent for 30 minutes and then was taken out and dried for 2 hours, followed by placing the dried base membrane in an oxygen-filled confined space to irradiate for 10 minutes by using an ultraviolet lamp with a wavelength of 185 nm for standby.

b. Solution Preparation

A 5 wt. % Nafion solution (perfluorosulfonic acid resin solution) was diluted to a concentration of 0.1 wt. % with a isopropanol solvent, as the low concentration perfluorosulfonic acid resin solution, and $SiO_2$ with a resin solid content of 5 wt. % and $CeO_2$ particles with a resin solid content of 5 wt. % were added. The mixed solution was fully stirred and poured into the treatment tank I for standby.

A 5 wt. % Nafion solution was diluted to a concentration of 2 wt. % with a isopropanol solvent, as the medium concentration perfluorosulfonic acid resin solution, and $SiO_2$ with a resin solid content of 5 wt. % and $CeO_2$ particles with a resin solid content of 5 wt. % were added. The mixed solution was fully stirred and placed into the treatment tank II for standby.

A 7 wt. % Nafion solution was selected as the high concentration resin impregnation solution, and a sulfonated polyetheretherketone solution with the same concentration of 7 wt. % was added in the resin impregnation solution, with a ratio of 1:1. The mixed solution was fully stirred and placed into the treatment tank III for standby.

c. Impregnation of Membrane

The pre-treated expanded polytetrafluoroethylene base membrane was coiled on the drive rollers of the wrap-around conveyor. Under the transmission of the drive rollers, the base membrane entered the treatment tank I for impregnating for 1.3 minutes, and then was transported along the extension tank wall with a transmission speed of 5 m/s. During this process, the excess mixed solution on the base membrane was squeezed and dropped back onto the extension tank wall during the rotation of the drive rollers, so as to achieve a certain filtering effect. Subsequently, the mixed solution on the surface of the base membrane dropped and was collected in the collection area during the transmission process of entering the drying oven I.

Subsequently, the base membrane entered the drying oven I for drying, and the temperature of the drying oven I was 100° C. The base membrane was first pre-cooled through the air cooler I with a cooling temperature of 45° C. after coming out of the drying oven I, and then was cooled through the air cooler II with a cooling temperature of 5° C.

After cooling, the base membrane entered the treatment tank II for impregnating for 1.1 minutes, following the same process as above, the base membrane was conducted to the filtering-drying-cooling process, and then entered the treatment tank III for impregnating for 0.7 minutes. Finally, the composite membrane was obtained after drying and cooling again.

Embodiment 2 a. Pre-Treatment of Base Membrane

The expanded polytetrafluoroethylene microporous membrane with a pore size of 10 μm, a porosity of 80% and a thickness of 15 μm was put into a 3 wt. % $H_2O_2$ solution and heated at 60° C. for 20 minutes, followed by washing with a large amount of deionized water. The washing manner was to completely impregnate the base membrane in deionized water for 6 seconds and then to take it out, and the process of impregnating-taking out was repeated for 7 times. After the surface was free of $H_2O_2$ residue, the base membrane was impregnated in an isopropanol solvent for 30 minutes and then was taken out and dried for 2 hours, followed by placing the dried base membrane in an oxygen-filled confined space to irradiate for 15 minutes by using an ultraviolet lamp with a wavelength of 185 nm for standby.

b. Solution Preparation

A 5 wt. % Nafion solution was diluted to a concentration of 0.5 wt. % with a isopropanol solvent, as the low concentration perfluorosulfonic acid resin solution, and $TiO_2$ with a resin solid content of 2 wt. % and MnO particles with a resin solid content of 2 wt. % were added. The mixed solution was fully stirred and poured into the treatment tank I for standby.

A 5 wt. % Nafion solution was diluted to a concentration of 4 wt. % with a isopropanol solvent, as the medium concentration perfluorosulfonic acid resin solution, and $TiO_2$ with a resin solid content of 2 wt. % and MnO particles with a resin solid content of 2 wt. % were added. The mixed solution was fully stirred and placed into the treatment tank II for standby.

A 10 wt. % Nafion solution was selected as the high concentration resin impregnation solution, and a sulfonated polyetheretherketone solution with the same concentration of 10 wt. % was added in the resin impregnation solution, with a ratio of 1:1. The mixed solution was fully stirred and placed into the treatment tank III for standby.

c. Impregnation of Membrane

The pre-treated expanded polytetrafluoroethylene base membrane was coiled on the drive rollers of the wrap-around conveyor. Under the transmission of the drive rollers, the base membrane entered the treatment tank I for impregnating for 19.5 minutes, and then was transported along the extension tank wall with a transmission speed of 5 m/s. During this process, the excess mixed solution on the base membrane was squeezed and dropped back onto the extension tank wall during the rotation of the drive rollers, so as to achieve a certain filtering effect. Subsequently, the mixed solution on the surface of the base membrane dropped and was collected in the collection area during the transmission process of entering the drying oven I.

Subsequently, the base membrane entered the drying oven I for drying, and the temperature of the drying oven I was 100° C. The base membrane was first pre-cooled through the air cooler I with a cooling temperature of 45° C. after coming out of the drying oven I, and then was cooled through the air cooler II with a cooling temperature of 5° C.

After cooling, the base membrane entered the treatment tank II for impregnating for 16.5 minutes, following the same process as above, the base membrane was conducted to the filtering-drying-cooling process, and then entered the treatment tank III for impregnating for 10.5 minutes. Finally, the composite membrane was obtained after drying and cooling again.

Embodiment 3 a. Pre-Treatment of Base Membrane

The expanded polytetrafluoroethylene microporous membrane with a pore size of 20 μm, a porosity of 65% and a thickness of 30 μm was put into a 3 wt. % $H_2O_2$ solution and heated at 60° C. for 20 minutes, followed by washing with a large amount of deionized water. The washing manner was to completely impregnate the base membrane in deionized water for 8 seconds and then to take it out, and the process of impregnating-taking out was repeated for 8 times. After the surface was free of $H_2O_2$ residue, the base membrane was impregnated in an isopropanol solvent for 30 minutes and then was taken out and dried for 2 hours, followed by placing the dried base membrane in an oxygen-filled confined space to irradiate for 10 minutes by using an ultraviolet lamp with a wavelength of 185 nm for standby.

b. Solution Preparation

A 5 wt. % Nafion solution was diluted to a concentration of 1 wt. % with a isopropanol solvent, as the low concentration perfluorosulfonic acid resin solution, and $Al_2O_3$ with a resin solid content of 3 wt. % and $ZrO_2$ particles with a resin solid content of 3 wt. % were added. The mixed solution was fully stirred and poured into the treatment tank I for standby.

A 10 wt. % Nafion solution was diluted to a concentration of 6 wt. % with a isopropanol solvent, as the medium concentration perfluorosulfonic acid resin solution, and $Al_2O_3$ with a resin solid content of 3 wt. % and $ZrO_2$ particles with a resin solid content of 3 wt. % were added. The mixed solution was fully stirred and placed into the treatment tank II for standby.

A 20 wt. % Nafion solution was selected as the high concentration resin impregnation solution, and a sulfonated polyetheretherketone solution with the same concentration of 20 wt. % was added in the resin impregnation solution, with a ratio of 1:1. The mixed solution was fully stirred and placed into the treatment tank III for standby.

c. Impregnation of Membrane

The pre-treated expanded polytetrafluoroethylene base membrane was coiled on the drive rollers of the wrap-around conveyor. Under the transmission of the drive rollers, the base membrane entered the treatment tank I for impregnating for 39 minutes, and then was transported along the extension tank wall with a transmission speed of 5 m/s. During this process, the excess mixed solution on the base membrane was squeezed and dropped back onto the extension tank wall during the rotation of the drive rollers, so as to achieve a certain filtering effect. Subsequently, the mixed solution on the surface of the base membrane dropped and was collected in the collection area during the transmission process of entering the drying oven I.

Subsequently, the base membrane entered the drying oven I for drying, and the temperature of the drying oven I was 100° C. The base membrane was first pre-cooled through the air cooler I with a cooling temperature of 45° C. after coming out of the drying oven I, and then was cooled through the air cooler II with a cooling temperature of 5° C.

After cooling, the base membrane entered the treatment tank II for impregnating for 33 minutes, following the same process as above, the base membrane was conducted to the filtering-drying-cooling process, and then entered the treatment tank III for impregnating for 21 minutes. Finally, the composite membrane was obtained after drying and cooling again.

Comparative Example 1

Pre-treatment of base membrane: the expanded polytetrafluoroethylene microporous membrane was put into a 3 wt. % $H_2O_2$ solution and heated at 60° C. for 20 minutes, followed by washing with a large amount of deionized water until the surface of the membrane was free of $H_2O_2$ residue, and then was dried naturally. Then, the membrane was impregnated in an isopropanol solvent for 60 minutes, and was taken out and dried for standby.

Impregnation of membrane: the expanded polytetrafluoronethylene was coiled on the drive rollers, and then was impregnated in the treatment tank containing Nafion resin solution with a fixed concentration of 10 wt. % for 5 minutes, followed by drying and rolling up.

Comparative Example 2 a. Pre-Treatment of Base Membrane

The expanded polytetrafluoroethylene microporous membrane with a pore size of 20 μm, a porosity of 65% and a thickness of 30 μm was put into a 3 wt. % $H_2O_2$ solution and heated at 60° C. for 20 minutes, followed by washing with a large amount of deionized water. The washing manner was to completely impregnate the base membrane in deionized water for 8 seconds and then to take it out, and the process of impregnating-taking out was repeated for 8 times. After the surface was free of $H_2O_2$ residue, the base membrane was impregnated in an isopropanol solvent for 30 minutes and then was taken out and dried for 2 hours, followed by placing the dried base membrane in an oxygen-filled confined space to irradiate for 10 minutes by using an ultraviolet lamp with a wavelength of 185 nm for standby.

b. Solution Preparation

A 10 wt. % Nafion solution was diluted to a concentration of 5 wt. % with a isopropanol solvent, as the low concentration perfluorosulfonic acid resin solution, and $Al_2O_3$ with a resin solid content of 3 wt. % and $ZrO_2$ particles with a resin solid content of 3 wt. % were added. The mixed solution was fully stirred and poured into the treatment tank I for standby.

A 10 wt. % Nafion solution was diluted to a concentration of 5 wt. % with a isopropanol solvent, as the medium concentration perfluorosulfonic acid resin solution, and $Al_2O_3$ with a resin solid content of 3 wt. % and $ZrO_2$ particles with a resin solid content of 3 wt. % were added. The mixed solution was fully stirred and placed into the treatment tank II for standby.

A 10 wt. % Nafion solution was selected as the high concentration resin impregnation solution, and a 5 wt. % sulfonated polyetheretherketone solution was added in the resin impregnation solution, with a ratio of 1:1. The mixed solution was fully stirred and placed into the treatment tank III for standby.

c. Impregnation of Membrane

The pre-treated expanded polytetrafluoroethylene base membrane was coiled on the drive rollers of the wrap-around conveyor. Under the transmission of the drive rollers, the base membrane entered the treatment tank I for impregnating for 39 minutes, and then was transported along the extension tank wall with a transmission speed of 5 m/s. During this process, the excess mixed solution on the base membrane was squeezed and dropped back onto the extension tank wall during the rotation of the drive rollers, so as to achieve a certain filtering effect. Subsequently, the mixed solution on the surface of the base membrane dropped and was collected in the collection area during the transmission process of entering the drying oven I.

Subsequently, the base membrane entered the drying oven I for drying, and the temperature of the drying oven I was 100° C. The base membrane was first pre-cooled through the air cooler I with a cooling temperature of 45° C. after coming out of the drying oven I, and then was cooled through the air cooler II with a cooling temperature of 5° C.

After cooling, the base membrane entered the treatment tank II for impregnating for 33 minutes, following the same process as above, the base membrane was conducted to the filtering-drying-cooling process, and then entered the treatment tank III for impregnating for 21 minutes. Finally, the composite membrane was obtained after drying and cooling again.

Test Example 1

The tensile property of the composite membrane prepared by the present invention was tested according to the National Standard HGT 2902-1997 (China). The results are shown in the table below.

| Embodiment | Tensile strength/MPa | Elongation/% | Proton conductivity/S/cm |
|---|---|---|---|
| Embodiment 1 | 34 | 278 | 0.096 |
| Embodiment 2 | 36 | 289 | 0.091 |
| Embodiment 3 | 38 | 296 | 0.093 |
| Comparative example1 | 26 | 221 | 0.076 |
| Comparative example2 | 27 | 206 | 0.063 |

Through comparison, it is found that the composite membrane prepared by the impregnation process of three impregnation tanks with different concentrations has relatively uniform thickness, better mechanical performance and electrochemical performance, and no hollow area inside. The formed resin layer is effectively distributed inside and on the surface of the composite membrane. The composite membrane prepared by the present invention has high mechanical strength and excellent proton conductivity.

However, in Comparative example 1, the base membrane was conducted to a single impregnation without compound doping. It can be obviously seen that the uniformity of the composite membrane is slightly poor and the electrochemical performance is lower than that of the composite membrane prepared by the present invention. In Comparative example 2, the impregnation tanks with the same concentration were used. Since the perfluorosulfonic acid resin solution cannot completely enter the micropores of the microporous membrane, the prepared composite membrane has many tiny pinhole structures, which will lead to gas leakage, perforation, and hollow areas inside, resulting in poor mechanical and electrochemical performances of the composite membrane.

Finally, it should be noted that the above embodiments are only used to illustrate the technical solutions of the present invention without limiting; although the present invention is described in detail with reference to the foregoing embodiments, the ordinary skilled in the art shall understand that they may still make amendments to the technical solutions disclosed in the foregoing embodiments, or make equal replacements for some or all of their technical characteristics; these amendments or replacements do not remove the essence of the corresponding technical solutions from the scope of the technical solutions of each embodiment of the present invention.

The invention claimed is:

1. A preparation process of a composite membrane for fuel cells, comprising the steps of:

S1: pretreating a base membrane by impregnating the base membrane in an alkaline solvent and then irradiating the base membrane by an ultraviolet lamp, wherein the base membrane is a tetrafluoroethylene microporous membrane with a pore diameter of 1-20 μm, a porosity of 65%-90%, and a thickness of 1-30 μm;

S2: impregnating the pre-treated base membrane in a solution I, performing a first-stage cooling and a second-stage cooling after drying, wherein the solution I is a mixture comprising a perfluorosulfonic acid resin solution, a water-retaining agent, and a free radical quencher, wherein in the solution I, a concentration of the perfluorosulfonic acid resin solution is 0.1 wt. %-1 wt. %, a mass of the water-retaining agent is 2%-5% of that of the perfluorosulfonic acid resin, a mass of the free radical quencher is 2%-5% of that of the perfluorosulfonic acid resin, and a mass ratio of the water-retaining agent to the free radical quencher is 1:1;

S3: impregnating the base membrane after completion of S2 in a solution II, performing the first-stage cooling and the second-stage cooling after drying, wherein the solution II is a mixture comprising the perfluorosulfonic acid resin solution, the water-retaining agent, and the free radical quencher, wherein in the solution II, a concentration of the perfluorosulfonic acid resin solution is 2 wt. %-6 wt. %, a mass of the water-retaining agent is 2%-5% of that of the perfluorosulfonic acid resin, a mass of the free radical quencher is 2%-5% of that of the perfluorosulfonic acid resin, and a mass ratio of the water-retaining agent to the free radical quencher is 1:1; and S4: impregnating the base membrane after completion of S3 in a solution III, performing the first-stage cooling after drying, wherein the solution III is a mixture comprising the perfluorosulfonic acid resin solution with a concentration of 7 wt. %-20 wt. % and a sulfonated polyetheretherketone solution with a concentration of 7 wt. %-20 wt. %, and a mass ratio of the perfluorosulfonic acid resin and the sulfonated polyetheretherketone is 1:1, wherein a temperature of the first-stage cooling is 40-50° C. and a temperature of the second-stage cooling is 0-10° C.

2. The preparation process according to claim 1, wherein in step S1 comprises:

S11: impregnating the base membrane in a 3 wt. %-5 wt. % hydrogen peroxide solution under 60-80° C. for 20-60 minutes;

S12: washing the impregnated base membrane with deionized water;

S13: impregnating the washed base membrane in an isopropanol solvent for 0.5-1 hours;

S14: vacuum drying the base membrane after completion of S13 for 2-3 hours under an environment filled with protective gas; and S15: ultraviolet irradiating the base membrane after completion of S14 at a wavelength of 185 nm for 10-15 minutes in an environment filled with oxygen.

3. The preparation process according to claim 2, wherein S12 comprising 5-8 times of washing the base membrane in deionized water for 5-8 seconds each; and in S14, the protective gas is an inert gas comprising nitrogen and argon.

4. The preparation process according to claim 1, wherein in step S2, the water-retaining agent is selected from $SiO_2$, ZnO, $TiO_2$, and $Al_2O_3$, the free radical quencher is selected from MnO, $MnO_2$, $CeO_2$, and $ZrO_2$, and the solvent of the perfluorosulfonic acid resin solution is isopropanol, n-propanol, or a mixture thereof.

5. The preparation process according to claim 1, wherein the drying temperature is 40-150° C.

6. The preparation process according to claim 1, wherein impregnation times of the base membrane in the solutions I, II, and III are 1.3, 1.1, and 0.7 times of a thickness of the base membrane by minutes, respectively.

7. The preparation process according to claim 1 is carried out in a continuous impregnation device, wherein the continuous impregnation device comprises a treatment tank I, a drying oven I, a treatment tank II, a drying oven II, a treatment tank III, and a drying oven III arranged successively along a direction of transferring the composite membrane; each outlet of the drying ovens I, II and III is provided with a cooling treatment area for cooling the base membrane, wherein each cooling treatment area comprises an air cooler I near the outlet of the drying oven, and an air cooler II near the inlet of the treatment tank; and the continuous impregnation device further comprises a plurality of drive rollers for transferring the composite membrane.

8. The preparation process according to claim 7, wherein each outlet of the treatment tanks I, II, and III is provided with an extension tank wall having some of the plurality of drive rollers disposed thereon, and an outside of each outlet of the treatment tanks I, II and III is provided with a collection area disposed below the base membrane.

9. A composite membrane for fuel cells produced according to the preparation process of claim 1.

* * * * *